(12) United States Patent
Yagi et al.

(10) Patent No.: US 7,654,817 B2
(45) Date of Patent: Feb. 2, 2010

(54) VENT PIECE

(75) Inventors: Takashige Yagi, Suita (JP); Shinichiro Goda, Kako-gun (JP)

(73) Assignees: Yugenkaisha T&K Corporation, Osaka (JP); GMJ Corporation, Hyogo (JP)

( * ) Notice: Subject to any disclaimer, the term of this patent is extended or adjusted under 35 U.S.C. 154(b) by 0 days.

(21) Appl. No.: 11/795,878

(22) PCT Filed: Jan. 26, 2006

(86) PCT No.: PCT/JP2006/301193
§ 371 (c)(1),
(2), (4) Date: Apr. 15, 2008

(87) PCT Pub. No.: WO2006/080378
PCT Pub. Date: Aug. 3, 2006

(65) Prior Publication Data
US 2008/0258037 A1    Oct. 23, 2008

(30) Foreign Application Priority Data
Jan. 28, 2005    (JP)    ................. 2005-021653

(51) Int. Cl.
*B29C 33/10*    (2006.01)
(52) U.S. Cl. .............. 425/472; 249/141; 428/28.1; 428/812
(58) Field of Classification Search ............... 425/28.1, 425/472, 812; 249/141
See application file for complete search history.

(56) References Cited

U.S. PATENT DOCUMENTS

| | | | | |
|---|---|---|---|---|
| 4,740,145 A | * | 4/1988 | Shurman | 425/28.1 |
| 5,922,237 A | * | 7/1999 | Green | 425/28.1 |
| 6,817,848 B2 | * | 11/2004 | Ishihara | 425/28.1 |

FOREIGN PATENT DOCUMENTS

| | | |
|---|---|---|
| JP | 62-193039 | 12/1987 |
| JP | 2004-291615 | * 10/2004 |

* cited by examiner

*Primary Examiner*—James Mackey
(74) *Attorney, Agent, or Firm*—Wenderoth, Lind & Ponack, L.L.P.

(57) ABSTRACT

To provide a vent piece capable of being attached to and detached from a mold easily.

A vent piece body 4 and a connection sleeve 5 are connected to each other to form a cylindrical shape. The vent piece body 4 and the connection sleeve 5 are inserted in an insertion hole 3 penetrating the wall surface of a mold 2 to connect the inside of the mold 2 to the outside thereof. One end portion 9 of the vent piece body 4 is beforehand formed into a countersunk head screw shape. A cone-shaped concave portion 10 is beforehand formed around the inside opening of the insertion hole 3 in the mold 2. The countersunk head screw shaped end portion 9 is fitted in the cone-shaped concave portion 10. Thereby, the movement of a vent piece 1 to the other side is restrained. A nut 8 is threadedly mounted in the other end portion 14 of the connection sleeve 5 from the outside of the mold 2. By mounting and demounting the nut 8, the vent piece 1 can be attached to and detached from the mold 2 easily.

9 Claims, 5 Drawing Sheets

(a)

(b)

VENT PIECE

TECHNICAL FIELD

The present invention relates to a vent piece which connects the inside of a mold to the outside thereof, the mold being used for molding of a rubber product etc. including a tire, to exhaust air from the interior of the mold.

BACKGROUND ART

Generally, a mold used for molding of a rubber product etc. including a tire is provided with a vent hole for exhausting air from the interior of the mold to prevent an air bubble defect from developing in a molded product. The vent hole, which is a small-diameter hole formed in a mold so as to connect the inside of the mold to the outside thereof, is sometimes provided with a valve element for opening and closing an inside opening of the hole to prevent outflow of a raw material in the mold (for example, Patent Document 1).

FIG. 5 is a sectional view of a vent hole disclosed in Patent Document 1. A vent hole 101 consists of a through hole 103 penetrating a mold 102 and a central hole 105 in a cylindrical vent piece 104 inserted in an insertion portion (diameter increasing portion) near the inner end of the through hole 103. At the inner end of the vent piece 104, a disc-shaped valve element 106 is installed to open and close the central hole 105.

The vent piece 104 is fixed to the mold 102 by press fitting or staking into the insertion portion, interference fitting utilizing thermal expansion and contraction, bonding using an adhesive, or the like.

[Patent Document 1] Japanese Patent Laid-Open No. 2004-291615 (paragraph Nos. 0019 to 0021, FIG. 1)

DISCLOSURE OF THE INVENTION

The above-described vent piece is fixed to the insertion portion of the through hole formed in the mold so as not to be removed easily. If the vent piece is removed forcibly, there is a fear of occurrence of damage to the insertion portion, such as an increase in hole diameter.

Therefore, when the necessity of repairing or replacing the vent piece arises because of clogging of raw material for molded product or damage to the valve element, the vent piece having been repaired or replaced is not remounted in the original insertion portion in which the vent piece before repair or replacement has been mounted, and is mounted in the insertion portion of a through hole newly formed in a separate portion of the mold. In this case, the cost required for repair or replacement of vent piece is high. Also, the service life of mold may be shortened because the number of repairs or replacements is limited.

An object of the present invention is to provide a vent piece capable of being repaired or replaced easily without forming a new insertion hole (through hole) in a mold.

To achieve the above object, the present invention provides a vent piece which is inserted in an insertion hole penetrating the wall surface of a mold and is formed into a cylindrical shape such that the vent piece connects the inside of the mold to the outside thereof, wherein a valve element for opening and closing the opening of a central hole in the vent piece is provided on one end surface located on the inside of the mold, and a locking means for locking the vent piece to the mold so as to prevent the movement of the vent piece to the other side in a state in which the vent piece is inserted in the insertion hole and a nut mounted threadedly in the other end portion from the outside of the mold are provided.

According to this configuration, the valve element is installed on one end surface of the cylindrical vent piece, the vent piece is inserted in the insertion hole in the mold so that the end surface thereof is directed to the inside of mold, and the nut is threadedly mounted in the other end portion of the vent piece from the outside of the mold, by which the vent piece can be mounted in the mold. Thereby, when the vent piece is repaired or replaced, the vent piece can be attached to and detached from the mold easily, without damaging the insertion hole in the mold, by mounting and demounting the nut.

Here, a configuration for mounting the vent piece in the insertion hole in the mold using the nut is explained. By threadedly mounting the nut in the other end portion of the vent piece inserted in the insertion hole from the outside of the mold, a force for moving the vent piece to the other side (mold outside) is produced, and also the movement of the vent piece is restrained by the locking means. Thereby, by tightening the nut strongly, the vent piece is fixed to the mold firmly.

As the method for inserting the vent piece into the insertion hole, if the vent piece is inserted from the inside of the mold and is pushed in by the locking means until the movement stops, the construction of the locking means can be simplified suitably. However, the vent piece may be inserted from the outside of the mold. In this case, after the vent piece has been inserted into the insertion hole, the locking means has only to be caused to function, for example, by turning the vent piece around the center axis.

For the locking means, it is preferable that one end portion be formed into a countersunk head screw shape, and one end portion of this countersunk head screw shape be engaged with a cone-shaped concave portion formed around the inside opening of the insertion hole in the mold. The countersunk head screw shape is a shape which projects outward in the radial direction and has a taper on the other side surface (center side in the axial direction).

According to this configuration, by tightening the nut, the taper in one end portion of the countersunk head screw shape is pressed on the cone-shaped concave portion around the insertion hole, so that a gap, through which the raw material for molded product flows out between the mold and the vent piece can be closed while the vent piece is made easy to insert by making the diameter of vent piece smaller than that of the insertion hole. As the locking means, a means in which a disc-shaped flange is formed in one end portion and a means in which the whole of the vent piece is formed into a circular cone shape can be used typically in addition to the means in which one end portion of the vent piece is formed into a countersunk head screw shape.

The size of one end portion of the countersunk head screw shape is preferably set so that one end surface of the vent piece projects inward from the inner surface of the mold in a state in which one end portion is fitted in the concave portion in the mold. In this case, a portion between the other side surface of one end portion of the vent piece and the inner surface of the mold forms a boundary portion between the vent piece and the mold, and this boundary portion is opened when the vent piece is drawn out. Therefore, even if foreign matters accumulate in the boundary portion, the vent piece does not become less liable to be drawn out. Since one end portion of the vent piece projects slightly, a shallow concave portion is formed on the molded product. However, this shallow concave portion makes the appearance of molded product better.

The vent piece is configured so that a cylindrical connection sleeve is connected to the other end of a vent piece body including one end portion, and the nut is threadedly engaged with the connection sleeve. By doing this, the length of the whole of vent piece can be caused to correspond to the wall thickness different for each mold portion by adjusting the length of connection sleeve. Since the connection sleeve has no one end portion of the countersunk head screw shape, the connection sleeve can be manufactured more easily than the bent piece body, and the adjustment of the length thereof can be made easily.

A positioning concave portion for positioning the valve element is formed in one end surface, the bottom surface of the positioning concave portion is formed substantially into a circular cone shape such that the center projects to one side, and the valve element is installed on the bottom surface by spot welding. By doing this, the valve element can be set in an open state at a predetermined angle by welding distortion caused by spot welding in addition to the inclination of the bottom surface of the positioning concave portion.

EFFECTS OF THE INVENTION

As is apparent from the above explanation, according to the present invention, since the vent piece is mounted in the insertion hole in the mold by using the locking means (one end portion of countersunk head screw shape, etc.) and the nut, the vent piece can be attached to and detached from the mold easily, without damaging the insertion hole in the mold, by mounting and demounting the nut. Thereby, the vent piece can be repaired or replaced easily, so that the cost can be reduced. Also, when the vent piece is repaired or replaced, a new insertion hole need not be formed in the mold, so that the service life of mold can be prolonged.

Figure 1:
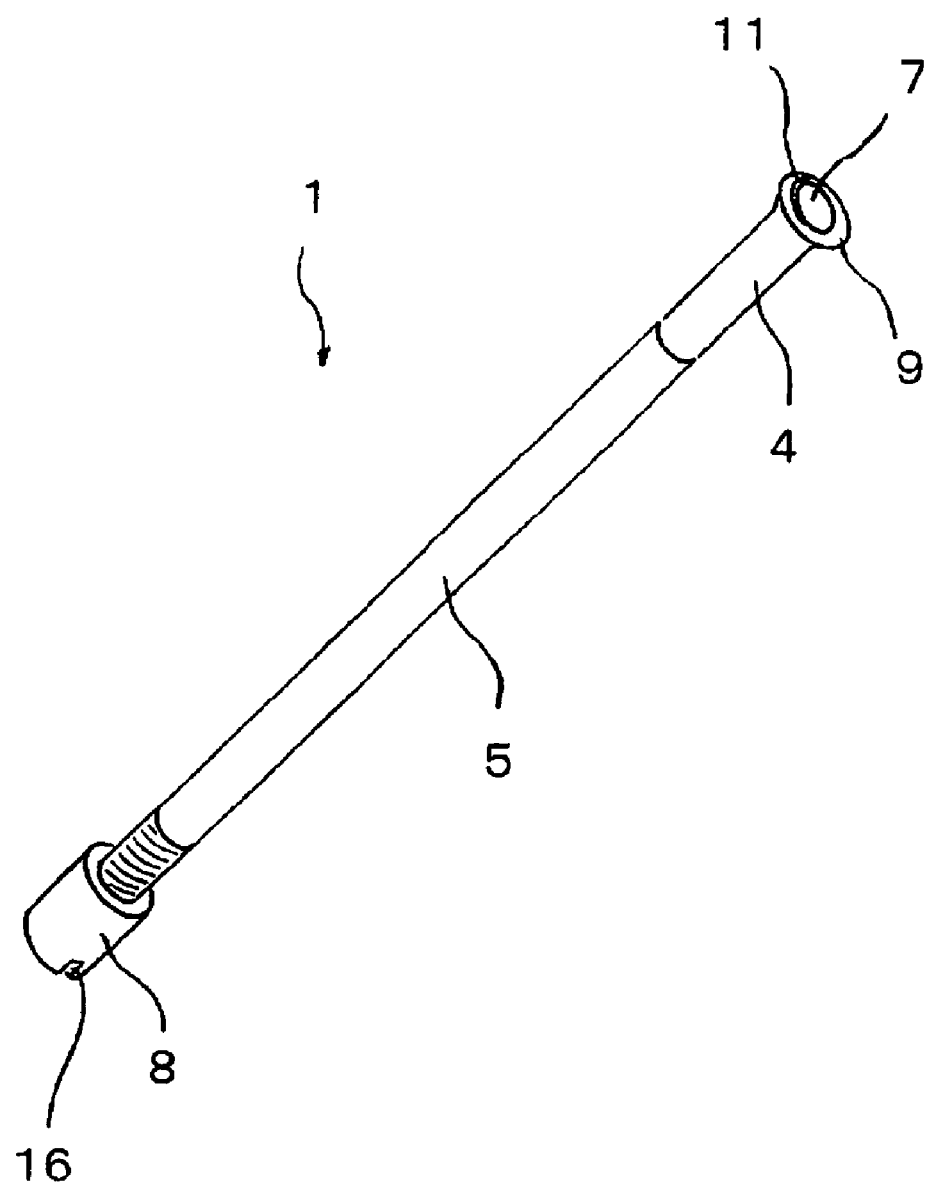
[FIG. 1] A perspective view of a vent piece in accordance with the present invention.

DESCRIPTION OF SYMBOLS 1 vent piece
2 mold
3 insertion hole
4 vent piece body
5 connection sleeve
6 central hole
7 valve element
8 nut
9 one end portion
10 concave portion
11 positioning concave portion

BEST MODE FOR CARRYING OUT THE INVENTION

Figure 2:
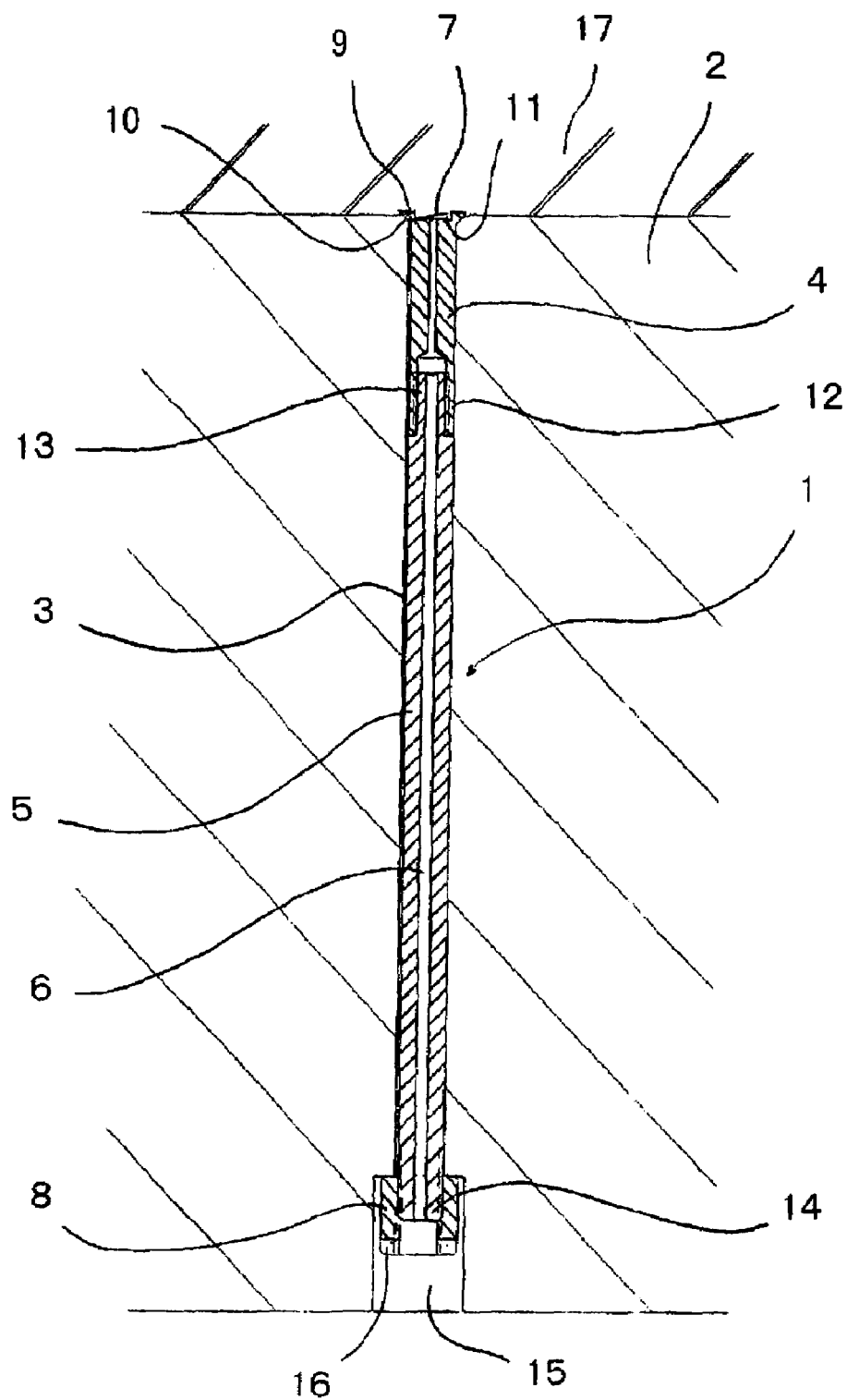
[FIG. 2] A sectional view in the axial direction of a vent piece mounted in a mold.
Figure 3:
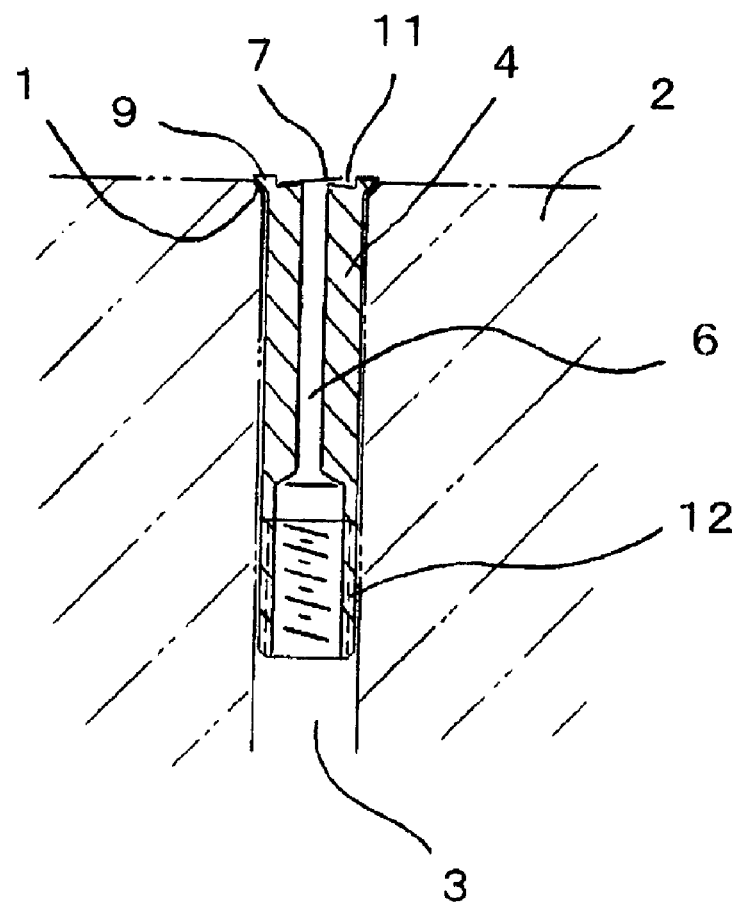
[FIG. 3] Sectional views in the axial direction of a vent piece body.
Figure 3:
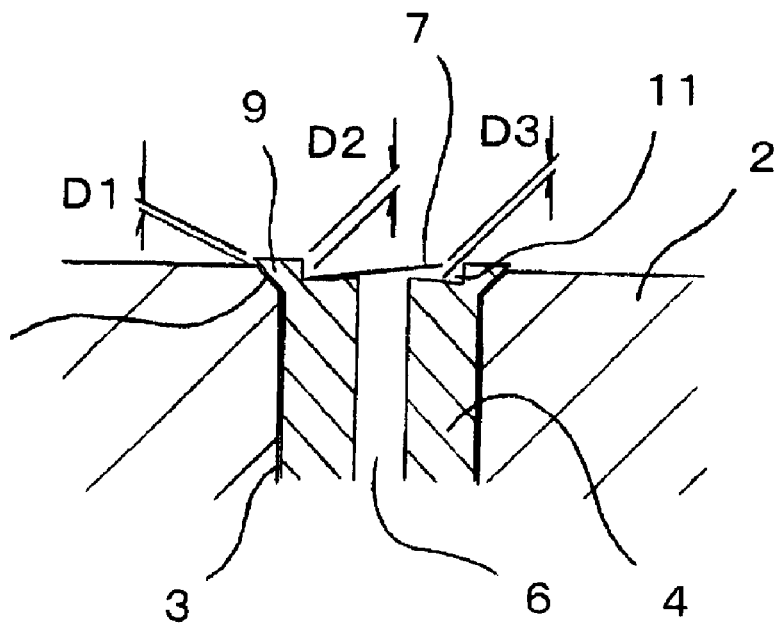

A best mode for carrying out a vent piece in accordance with the present invention will now be described with reference to the accompanying drawings. FIG. 1 is a perspective view of a vent piece in accordance with the present invention, and FIG. 2 is a sectional view in the axial direction of a vent piece mounted in a mold. FIG. 3 is sectional views in the axial direction of a vent piece body, FIG. 3(a) being a sectional view in the axial direction of the whole of the vent piece body, and FIG. 3(b) being an enlarged sectional view of a portion near one end of the vent piece body.

A vent piece 1 is used to exhaust air from the interior of a mold 2 to prevent an air bubble defect from developing in a molded product such as a tire. The vent piece 1 is inserted in an insertion hole 3 penetrating the wall surface of the mold 2 to connect the inside of the mold 2 to the outside thereof.

This vent piece 1 includes a cylindrical vent piece body 4 made of, for example, steel, a connection sleeve 5 made of, for example, steel, which is connected to the vent piece body 4 to adjust the length of the vent piece 1, a disc-shaped valve element 7 made of, for example, steel, which prevents outflow of the raw material for the molded product 17 to a central hole 6 in the vent piece body 4, and a nut 8 for fixing these elements to the mold 2. The vent piece body 4, the connection sleeve 5, and the valve element 7 may be formed of any material such as stainless steel in addition to steel.

The vent piece body 4 has a diameter set so as to be slightly smaller than that of the insertion hole 3 (for example, about 3 mm in diameter), and has a length set so as to be about 14 mm, which is in the range in which the vent piece body 4 can be machined, for example, by an automatic lathe, or a length having been adjusted according to the hardness of material on the basis of 14 mm.

One end portion 9 of the vent piece body 4 projects outward in the radial direction (for example, about 4 mm in diameter), and the side surface of the one end portion 9 is formed into a countersunk head screw shape having a taper (for example, an angle of inclination of 45° with respect to the center axis direction), and engages with the inner surface of the mold 2, serving as a locking means for preventing the movement of the vent piece 1 to the other side (outside of the mold 2). The diameter, thickness, and taper angle of the one end portion 9 may be adjusted according to the hardness of material of the vent piece body 4.

The one end portion 9 is fitted in a cone-shaped concave portion 10 formed around the inside opening of the insertion hole 3 in a state in which the vent piece body 4 is inserted in the insertion hole 3. The concave portion 10 is formed, for example, by cutting together with the insertion hole 3, and one end surface of the one end portion 9 is set to a size projecting inward by D1 (for example, 0.1 mm or smaller) from the inner surface of the mold 2. Thereby, a shallow concave portion is formed in the surface of the molded product 17, which makes the appearance of the molded product 17 better.

In the one end surface of the vent piece body 4, a circular positioning concave portion 11 for positioning the valve element 7 is formed, and a part near the peripheral edge of the valve element 7 is spot welded to the bottom surface of the positioning concave portion 11 so that the valve element 7 opens and closes the inside opening of the central hole 6 in the vent piece body 4.

The bottom surface of the positioning concave portion 11 substantially has a circular cone shape such that the center portion projects to one side, and a portion near the peripheral edge on the opposite side of the valve element 7 is caused to float by the inclination of the bottom surface and the welding deformation caused by spot welding, so that the valve element 7 becomes in an open state at a desired degree of opening according to the hardness of raw material of the molded product 17.

The diameter of the positioning concave portion 11 is set so as to be smaller than the diameter of the one end portion 9 and larger than the diameter (for example, about 0.6 mm in diameter) of the central hole 6 (for example, about 2.5 mm in diameter). Also, the depth of the positioning concave portion 11 is set so as to be a depth (D2, for example, about 0.35 mm) such as to be capable of hooking the peripheral edge of the valve element 7 and accommodating the valve element 7 in an open state.

The angle of inclination of the bottom surface of the positioning concave portion 11 is set in the range of, for example, 85° to 90° with respect to the axial direction. Also, the valve element 7 has a diameter larger than that of the central hole 6 and slightly smaller than that of the positioning concave portion 11 (for example, about 2.4 mm in diameter). Thereby, the maximum clearance (D3) between the valve element 7 and the bottom surface is set in the range of, for example, 0.15 to 0.25 mm, so that the raw material for the molded product 17 is prevented from flowing out while air is exhausted from the interior of the mold 2.

In the other end portion 12 of the vent piece body 4, the central hole 6 therein is formed so as to have a diameter larger than the diameters of other portions. One end portion 13 of the connection sleeve 5 is threadedly engaged with this large-diameter portion of the central hole 6, by which the connection sleeve 5 is connected to the vent piece body 4.

The connection sleeve 5 has a cylindrical shape having an outside diameter of, for example, about 3 mm and a central hole of about 0.8 mm in diameter. The outside diameter of the one end portion 13 is made smaller than the diameters of other portions so that the one end portion 13 engages threadedly with the central hole 6 in the other end portion 12 of the vent piece body 4. The length of the connection sleeve 5 is adjusted according to the wall thickness of the mold 2 so that the other end portion 14 of the connection sleeve 5 projects into a circular concave portion 15 formed around the outside opening of the insertion hole 3 in the state in which the connection sleeve 5 is connected to the vent piece body 4 and inserted in the insertion hole 3.

In the other end portion 14 of the connection sleeve 5 projecting into the concave portion 15, the nut 8 is threadedly mounted from the outside of the mold 2. By locking the one end portion 9 of the vent piece body 4 to the mold 2 and by tightening the nut 8, the vent piece 1 is fixed to the mold 2.

The nut 8 is a thin-wall round-shaped nut. By forming a groove 16 for screwdriver on the other surface of the nut 8, the concave portion 15 is made as small as possible as compared with the case where the ordinary hexagon nut is used. Thereby, a phenomenon that the temperature of the mold 2 cannot be kept because of poor heat conduction or increased heat dissipation caused by cutting of a large hole in the back surface of the mold 2 is prevented, and thereby a trouble in manufacturing the molded product 17 can be eliminated. The shape of the nut 8 is not subject to any special restriction. For example, the nut 8 may be configured so that a special nut in which a hexagonal or another suitable shape is cut in the inner hole thereof is used, and a jig is inserted in this inner hole so as to be attached and detached.

Next, a procedure for mounting the vent piece 1 in the mold 2 is explained. First, the one end portion 13 of the connection sleeve 5 is threadedly engaged with the other end portion 12 of the vent piece body 4, by which the connection sleeve 5 is connected to the vent piece body 4. The other end portion 14 of the connection sleeve 5 is inserted into the insertion hole 3 in the mold 2 from the inside opening of the insertion hole 3, and the vent piece body 4 and the connection sleeve 5 are pushed in the other direction. The one end portion 9 of the vent piece body 4 fits in the concave portion 10 around the inside opening of the insertion hole 3, by which the vent piece 1 is positioned in the axial direction and in the direction perpendicular to the axial direction.

The one end portion 9 of the vent piece body 4 is locked to the mold 2, by which the movement of the vent piece 1 in the other direction is regulated. The length of the connection sleeve 5 is set beforehand to a length in accordance with the wall thickness of the mold 2 in the portion in which the vent piece 1 is mounted, and the other end portion 14 of the connection sleeve 5 is allowed to project into the concave portion 15 around the outside opening of the insertion hole 3. The nut 8 is threadedly mounted in the other end portion 14 and is tightened by a screwdriver, by which the vent piece 1 is fixed firmly to the mold 2.

In the case where a damaged vent piece 1 is repaired or replaced, the nut 8 is loosened and removed by a screwdriver, and the vent piece body 4 and the connection sleeve 5 are drawn out of the inside opening of the insertion hole 3, for example, by striking the connection sleeve 5 from the outside of the mold 2. Since the one end portion 9 of the vent piece body 4 has a countersunk head screw shape, foreign matters are less liable to accumulate between the end portion 9 and the inside opening of the insertion hole 3, so that the vent piece body 4 and the connection sleeve 5 can be drawn out easily. After the damaged vent piece 1 has been removed, a new vent piece 1 is mounted in the same insertion hole 3 by the same procedure.

Figure 4:
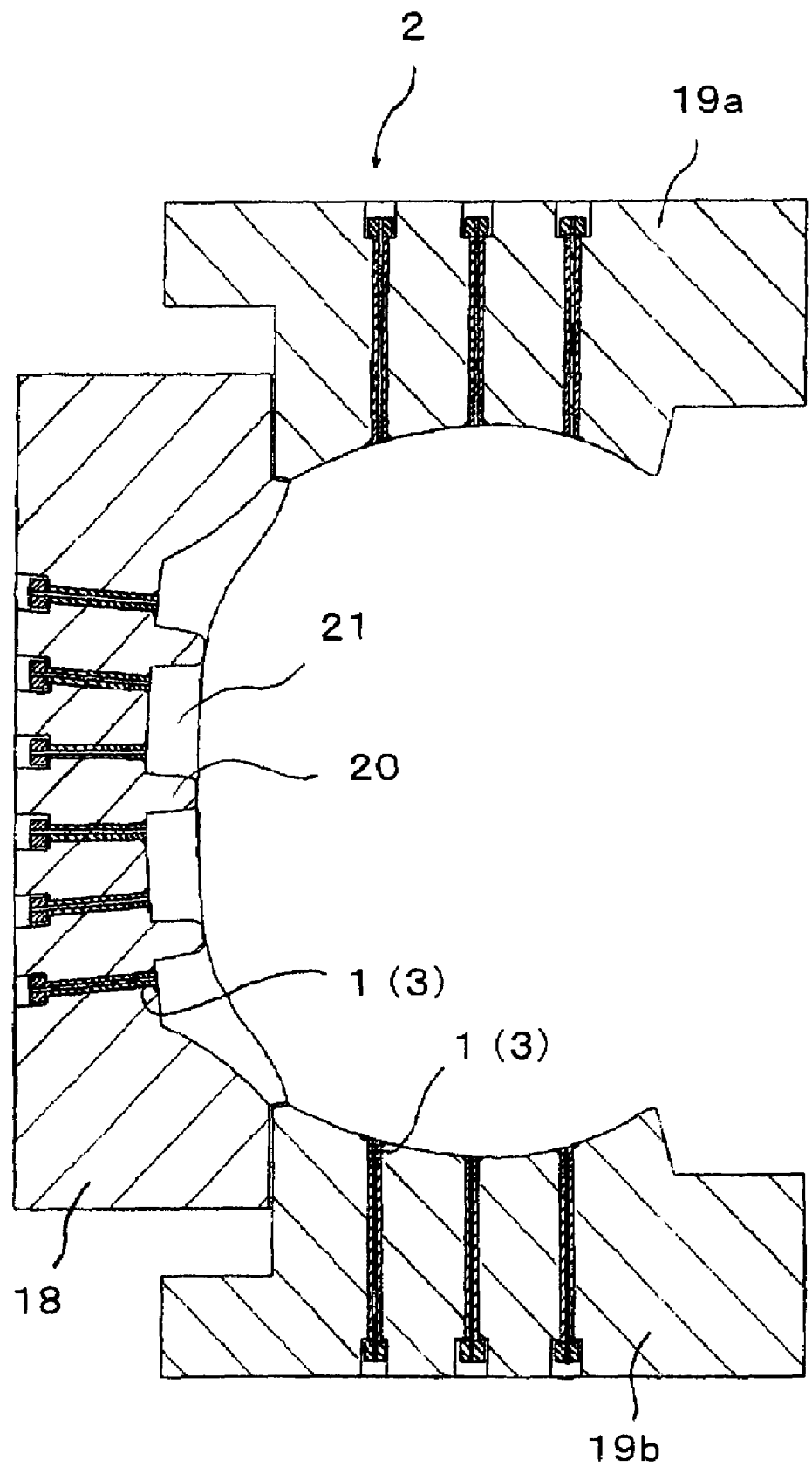
[FIG. 4] A sectional view of a mold mounted with vent pieces.
Figure 5:
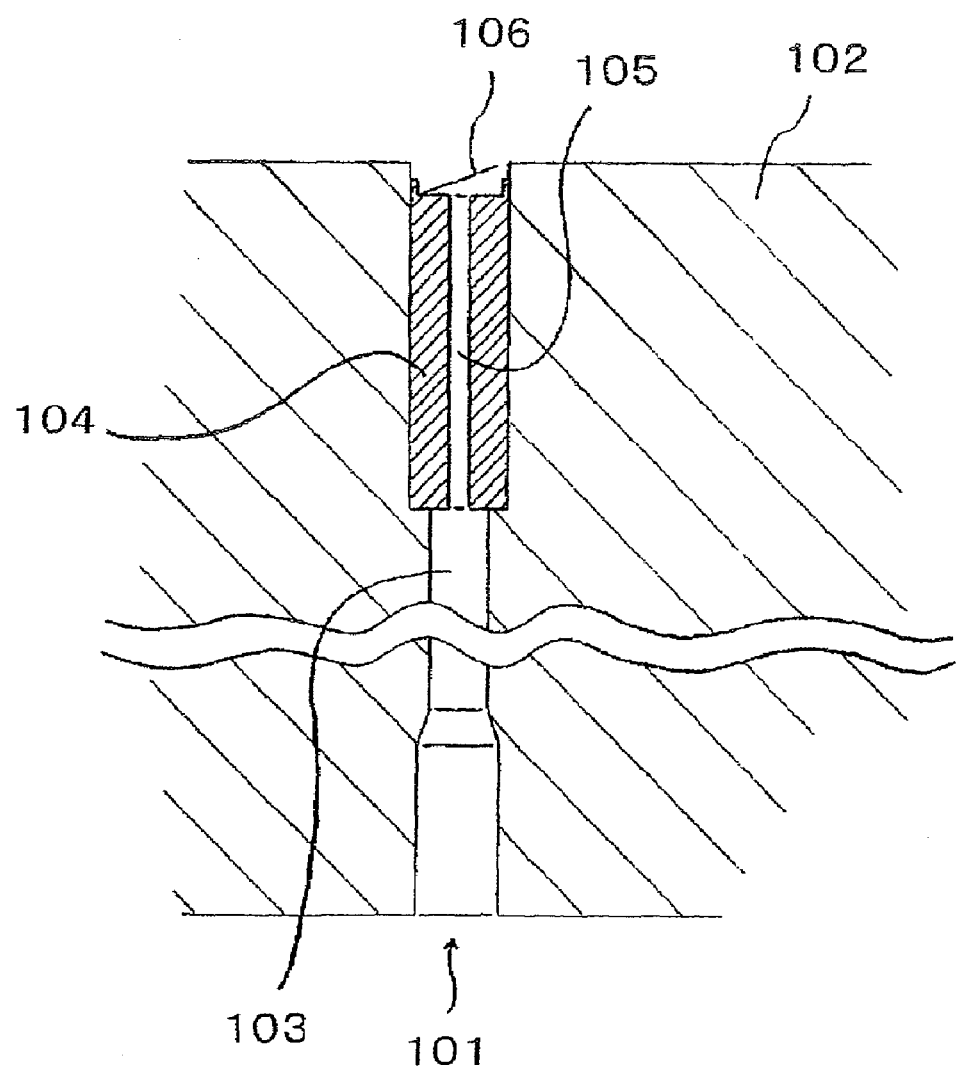
[FIG. 5] A sectional view of a conventional vent hole.

Next, a mold having this air venting structure is explained. FIG. 4 is a sectional view of a mold mounted with the vent pieces. As shown in FIG. 4, the mold 2, which is used for molding a tire, is made up of a ring-shaped sector 18 made of, for example, steel for molding the peripheral surface of the tire, and upper and lower ring-shaped side plates 19a and 19b made of, for example, steel for molding the side surfaces of the tire. The mold 2 is assembled so that the upper side plate 19a and the lower side plate 19b are fitted in the central hole of the sector 18. The mold 2 may be formed of any material such as stainless steel in addition to steel.

On the inner peripheral surface of the sector 18, longitudinal ribs 20 and transverse ribs 21 for forming the longitudinal grooves and the transverse grooves of tire are formed. Portions that do not interfere with the longitudinal ribs 20 and the transverse ribs 21 of the sector 18 and the upper and lower side plates 19a and 19b are formed with a plurality of insertion holes 3, and the vent piece 1 is mounted in each of the insertion holes 3.

The mold 2 is assembled while crude rubber (green tire), which is a raw material, and a bladder (not shown) are arranged on the inside, and the heated and pressurized crude rubber is pressed on the inner surface of the mold 2 from the inside by the bladder, by which the tire is molded.

At this time, the vent piece 1 exhausts air that is present between the inner surface of the mold 2 and the crude rubber, by which the formation of an air bubble defect in the tire is prevented. When the crude rubber reaches the inner surface of the mold 2, the crude rubber presses the valve element 7, and therefore the valve element 7 closes the inside opening of the central hole 6 in the vent piece body 4, so that the outflow of crude rubber into the central hole 6 is prevented. Thereby, a high-quality tire without air bubble defects and incense stick shaped protrusions can be molded.

The present invention is not limited to the above-described embodiment, and appropriate changes can be made within the scope of the present invention. For example, the present invention can be applied to any vent piece, for example, for a mold used to mold an air suspension, in addition to a mold used to mold a tire. The raw material used for molding may be any material such as synthetic resin or metal in addition to rubber.

The length of the vent piece body 4 may be changed so as to correspond to the wall thickness of the mold 2 without providing the connection sleeve 5. The configuration may be such that one side surface of the vent piece body 4 is retreated in place of being projected inward from the inner surface of the mold 2, and thereby a low convex portion is formed on the surface of the molded product 17, by which a different appearance of the molded product 17 is obtained.

INDUSTRIAL APPLICABILITY

In order to prevent an air bubble defect from developing in a molded product at the time of molding a rubber product etc. including a tire, the vent piece according to the present invention, which is attached to the mold so as to connect the inside of the mold to the outside thereof, can be used for exhausting air from the inside of the mold.

What is claimed is:

1. A vent piece for use with a mold and to be inserted in an insertion hole penetrating a wall surface of the mold, said vent piece having a cylindrical shape such that the vent piece connects an inside of the mold to an outside of the mold, the insertion hole of the mold having a taper on the inside of the wall surface of the mold, said vent piece comprising:
   a first end to face toward the inside of the mold;
   a second end to face toward the outside of the mold;
   a central hole through the vent piece to communicate the inside and outside of the mold;
   a valve element, located on the first end, for opening and closing the central hole;
   a lock for locking the vent piece to the mold so as to prevent movement of the vent piece toward the outside of the mold, said lock having a screw-head-shaped end with a taper projecting radially outward to be fitted to the taper of the insertion hole on the inside of the mold; and
   a nut to be mounted threadedly to the second end of the vent piece.

2. The vent piece according to claim 1, wherein the screw-head-shaped end has a size such that the of the screw-head-shaped end projects inward from an inner surface of the mold in a state in which the screw-head-shaped end is fitted in the taper in the mold.

3. A mold mounted with the vent piece described in claim 1.

4. A vent piece for use with a mold and to be inserted in an insertion hole penetrating a wall surface of the mold, said vent piece having a cylindrical shape such that the vent piece connects an inside of the mold to an outside of the mold, the insertion hole of the mold having a taper on the inside of the wall surface of the mold, said vent piece comprising:
   a first end to face toward the inside of the mold;
   a second end to face toward the outside of the mold;
   a central hole through the vent piece to communicate the inside and outside of the mold;
   a valve element, located on the first end, for opening and closing the central hole;
   a lock for locking the vent piece to the mold so as to prevent movement of the vent piece toward the outside of the mold, said lock having a screw-head-shaped end with a taper projecting radially outward to be fitted to the taper of the insertion hole on the inside of the mold;
   a cylindrical connection sleeve connected to the second end of the vent piece; and
   a nut to be threadedly engaged with the connection sleeve.

5. A mold mounted with the vent piece described in claim 4.

6. A vent piece for use with a mold and to be inserted in an insertion hole penetrating a wall surface of the mold, said vent piece having a cylindrical shape such that the vent piece connects an inside of the mold to an outside of the mold, said vent piece comprising:
   a first end to face toward the inside of the mold;
   a second end to face toward the outside of the mold;
   a central hole through the vent piece to communicate the inside and outside of the mold;
   a positioning concave portion formed in the first end and having a substantially circular shape such that the center projects to one side,
   a valve element for opening and closing the central hole, said valve element being located in the positioning concave portion and spot welded to the vent piece;
   a lock for locking the vent piece to the mold so as to prevent movement of the vent piece toward the outside of the mold; and
   a nut to be mounted threadedly to the second end of the vent piece.

7. A mold mounted with the vent piece described in claim 6.

8. A vent piece for use with a mold and to be inserted in an insertion hole penetrating a wall surface of the mold, said vent piece having a cylindrical shape such that the vent piece connects an inside of the mold to an outside of the mold, said vent piece comprising:
   a first end to face toward the inside of the mold;
   a second end to face toward the outside of the mold;
   a central hole through the vent piece to communicate the inside and outside of the mold;
   a positioning concave portion formed in the first end and having a substantially circular shape such that the center projects to one side,
   a valve element for opening and closing the central hole, said valve element being located in the positioning concave portion and spot welded to the vent piece;
   a lock for locking the vent piece to the mold so as to prevent movement of the vent piece toward the outside of the mold;
   a cylindrical connection sleeve connected to the second end of the vent piece; and
   a nut to be threadedly engaged with the connection sleeve.

9. A mold mounted with the vent piece described in claim 8.

* * * * *